(12) United States Patent
Qiu et al.

(10) Patent No.: US 8,218,531 B2
(45) Date of Patent: Jul. 10, 2012

(54) SYSTEM FOR IMPROVING OPERATIONS IN AN IMS NETWORK

(75) Inventors: Chaoxin Qiu, Austin, TX (US); Bernard Ku, Austin, TX (US); Mehrad Yasrebi, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 663 days.

(21) Appl. No.: 11/733,060

(22) Filed: Apr. 9, 2007

(65) Prior Publication Data
US 2008/0247526 A1 Oct. 9, 2008

(51) Int. Cl.
*H04L 12/66* (2006.01)
(52) U.S. Cl. ........ 370/352; 370/310; 370/338; 370/349; 370/351
(58) Field of Classification Search .......... None
See application file for complete search history.

(56) References Cited

U.S. PATENT DOCUMENTS

| | | | |
|---|---|---|---|
| 2002/0027915 A1* | 3/2002 | Foti et al. ............... | 370/392 |
| 2003/0027569 A1* | 2/2003 | Ejzak ............... | 455/432 |
| 2004/0122934 A1* | 6/2004 | Westman et al. ............ | 709/223 |
| 2004/0205241 A1* | 10/2004 | Aarnos et al. ............ | 709/245 |
| 2007/0061397 A1* | 3/2007 | Gregorat et al. ............ | 709/203 |
| 2007/0097879 A1* | 5/2007 | Bleckert et al. ............ | 370/254 |
| 2008/0254816 A1* | 10/2008 | Sun et al. ............ | 455/466 |

* cited by examiner

*Primary Examiner* — Jae Y Lee
(74) *Attorney, Agent, or Firm* — Akerman Senterfitt; Michael K. Dixon; Roy Zachariah (57) ABSTRACT

A system for improving operations in an Internet Protocol Multimedia Subsystem (IMS) network is provided. A system that incorporates teachings of the present disclosure may include, for example, a Telephone Number Mapping (ENUM) system having a controller element to receive from a terminating Serving Call Session Control Function (S-CSCF) first contact information for a communication device and second contact information for the terminating S-CSCF. Additional embodiments are disclosed.

8 Claims, 4 Drawing Sheets

SYSTEM FOR IMPROVING OPERATIONS IN AN IMS NETWORK

FIELD OF THE DISCLOSURE

The present disclosure relates generally to communication techniques and more specifically to a system for improving operations in an Internet Protocol Multimedia Subsystem (IMS) network.

BACKGROUND

To originate a voice over IP (VoIP) call between a calling device and a called device in an IMS network, an originating Serving Call Session Control Function (S-CSCF) that serves the calling device must generate at least two database queries to connect the call. In a first query, the originating S-CSCF submits an E.164 number of the called device to an a ENUM system which performs a first database search to identify a SIP URI of the called device. The ENUM provides the SIP URI of the called device to the originating S-CSCF in response to the first query. In a second query, the originating S-CSCF then submits the received SIP URI to an Interrogating CSCF (I-CSCF) to identify a terminating S-CSCF serving the called device. The I-CSCF forwards the SIP URI to a Home Subscriber Server (HSS) to perform a second database search for the second S-CSCF. The HSS provides to the I-CSCF a SIP URI of the terminating S-CSCF in response to the second query. Upon performing the two database queries, the terminating S-CSCF contacts a corresponding Proxy-CSCF serving the called device to place the call.

Performing multiple database queries with the HSS during call originations increases its workload and thereby introduces cost and potential maintenance issues for a service provider of the IMS network.

A need therefore arises for a system for improving operations in an IMS network

DETAILED DESCRIPTION

Embodiments in accordance with the present disclosure provide a system for improving operations in an IMS network.

In a first embodiment of the present disclosure, a computer-readable storage medium in an originating Serving Call Session Control Function (S-CSCF) can have computer instructions for querying a Telephone Number Mapping (ENUM) system to provide contact information associated with a communication device, and receiving from the ENUM system contact information for the communication device and a terminating S-CSCF assigned to the communication device.

In a second embodiment of the present disclosure, an S-CSCF can have a controller element to receive an assignment to provide communication services to a communication device, and supply an ENUM system with contact information for the communication device and the S-CSCF.

In a third embodiment of the present disclosure, an ENUM system can have a controller element to receive from a terminating S-CSCF first contact information for a communication device and second contact information for the terminating S-CSCF.

In a fourth embodiment of the present disclosure, a Home Subscriber Server (HSS) can have a controller element to configure an ENUM system with first contact information of an S-CSCF and second contact information of a communication device served by the S-CSCF In a fifth embodiment of the present disclosure, an originating communication device can have a controller element to supply an IP Multimedia Subsystem (IMS) network an E.164 number for establishing communications between the originating communication device and a terminating communication device without assistance from an Interrogating Call Session Control Function (I-CSCF).

Figure 1:
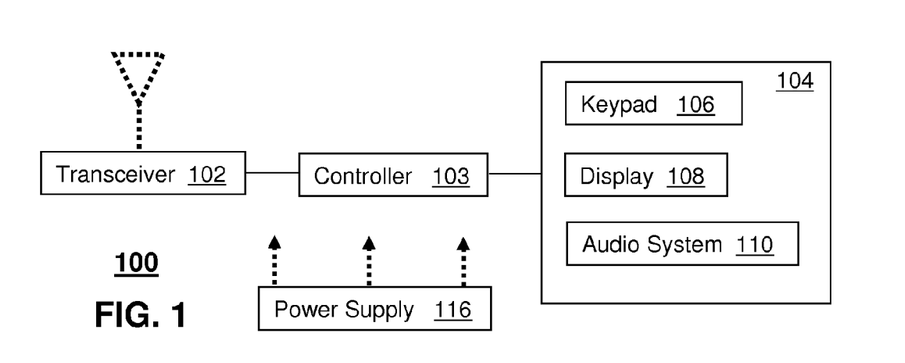
FIG. 1 depicts an exemplary embodiment of an IMS User Endpoint (IMS UE)

FIG. 1 depicts an exemplary embodiment of an IMS User Endpoint 100 (e.g. IMS UE). The IMS UE 100 can comprise a wireless or wireline transceiver 102, a user interface (UI) 104, a power supply 116, and a controller 103 for managing operations of the foregoing components. The transceiver 102 can utilize common communication technologies to support singly or in combination any number of wireline access technologies such as cable, xDSL, Public Switched Telephone Network (PSTN), and so on.

Singly or in combination with the wireline technology, the transceiver 102 can support singly or in combination any number of wireless access technologies including without limitation Digital Enhance Cordless Telecommunications (DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. SDR can be utilized for accessing public and private communication spectrum with any number of communication protocols that can be dynamically downloaded over-the-air to the IMS UE 100. It should be noted also that next generation wireline and wireless access technologies can also be applied to the present disclosure.

The UI element 104 can include a keypad 106 with depressible or touch sensitive keys and a navigation element such as a navigation disk, button, roller ball, or flywheel for manipulating operations of the IMS UE 100. The UI element 104 can further include a display 108 such as monochrome or color LCD (Liquid Crystal Display) which can be touch sensitive for manipulating operations of the IMS UE 100 and for conveying images to the end user of said device, and an audio system 110 that utilizes common audio technology for conveying and intercepting audible signals of the end user.

The power supply 116 can utilize common power management technologies such as replaceable batteries, supply regulation technologies, and charging system technologies for supplying energy to the components of the IMS UE 100 and to facilitate portable applications. Depending on the type of power supply 116 used, the IMS UE 100 can represent an immobile or portable communication device. The controller 103 can utilize computing technologies such as a microprocessor and/or digital signal processor (DSP) with associated storage memory such a Flash, ROM, RAM, SRAM, DRAM or other like technologies for controlling operations of the IMS UE 100. The computing technologies may also be integrated in the controller 103 as a System on Chip (SOC) design.

The IMS UE 100 can represent a single operational device or a family of devices configured in a master-slave arrangement. In the latter embodiment, the components of the IMS UE 100 can be reused in different form factors for the master and slave IMS UEs 100. The IMS UE 100 can also be represented by any number of communication devices including without limitation a laptop computer, a desktop computer, a cell phone, a personal digital assistant, a set-top-box (STB), or a cordless phone just to name a few. An end user can also utilize more than one type of IMS UE 100 and migrate between IMS UEs when desired. Additionally, each of the IMS UEs 100 can be addressed by one or more communication identifiers for establishing real-time (e.g., voice) and/or non-real time communications (e.g., text or recorded speech).

Figure 2:
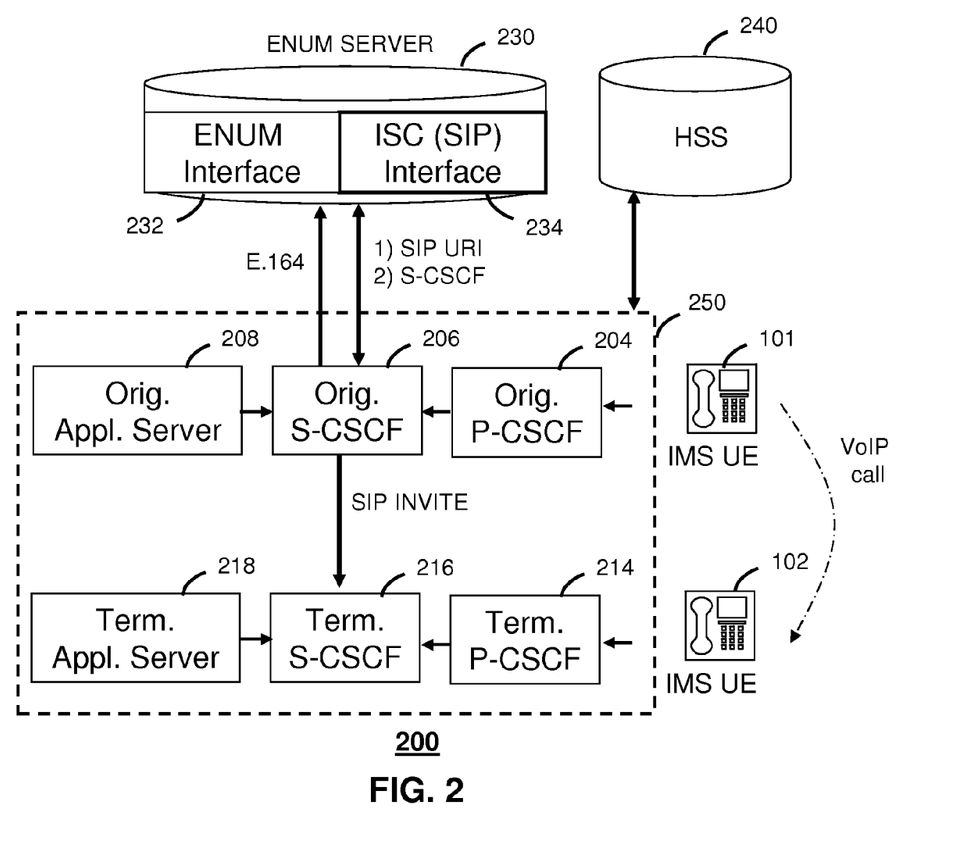
FIG. 2 depicts an exemplary embodiment of an IMS network from which a plurality of IMS UEs operate.

FIG. 2 depicts an IP Multimedia Subsystem (IMS) network 200. A portion of the IMS network 200 can comprise a Home Subscriber Server (HSS) 240, a tElephone NUmber Mapping (ENUM) system 230, a packet-switched network 250, and two IMS UE devices 100 denoted by IMS UE 101 and IMS UE 102. Notably, more IMS UEs can be connected to the IMS network 200 than the number shown.

In the IMS network 200, as an example, IMS UE 101 (e.g., originating communication device) can place a VoIP call to IMS UE 102 (e.g., terminating communication device) over the packet-switched network 250. The packet-switched network 250 can comprise a number of IMS compliant communication components including without limitation an Originating Proxy Call Session Control Function (P-CSCF) 204, an Originating Serving CSCF (S-CSCF) 206, a Terminating P-CSCF 214 and a Terminating S-CSCF 216. In the context of the present disclosure provided herein, network equipment that supports the calling IMS UE will be associated with the term 'Originating', and network equipment that supports the called IMS UE will be associated with the term 'Terminating'.

It should be noted that each S-CSCF can be considered originating or terminating, depending on each individual call. The distinction of an "originating" and "terminating" S-CSCF is merely provided for reference in the foregoing description. The IMS network 200 can also include one or more Application Servers (AS), such as Originating server 208 and Terminating server 218, for providing services to IMS UE 101 and IMS UE 102, respectively. Instances of the packet-switched network 250 can be repeated at various points of the IMS network 200.

As shown, Originating P-CSCF 204 and Originating S-CSCF 206 serve IMS UE 101, and Terminating P-CSCF 214 and Terminating S-CSCF 216 serve IMS UE 102. A P-CSCF is a Session Initiation Protocol (SIP) proxy serving as a first point of contact to an IMS UE 100. An S-CSCF is assigned to an IMS UE that can among other things query the ENUM system 230 to retrieve contact information for another IMS UE. The S-CSCF can use the contact information to route SIP calls to another IMS UE. The S-CSCF is a SIP server that also handles SIP registrations. It can also decide which ASs to forward a SIP message to in order to provide additional services offered by the ASs. ASs can provide routing services using ENUM lookups, and can enforce the policy of a service provider of the IMS network. The ASs can also host and execute value-added IMS services (e.g., Caller ID, Call waiting, Push To Talk, etc.).

The ENUM system 230 comprises a common ENUM interface component 232 for processing ENUM queries from S-CSCFs. The ENUM system 230 further comprises an ISC (SIP) Interface component 234 that allows the ENUM system 230 to act as a standard IMS Application Server. ENUM system 230 facilitates VoIP communications over the packet-switched network 250, and the packet-switched network 250 provides routing of VoIP calls based on SIP with a Uniform Resource Identifier (URI).

The HSS 240 can serve as a master database that supports the IMS network for handling calls. It can contain subscription information such as a name and address of a S-CSCF assigned to an IMS UE 100. It can also perform authentication and authorization of an IMS UE 100.

Figure 3:
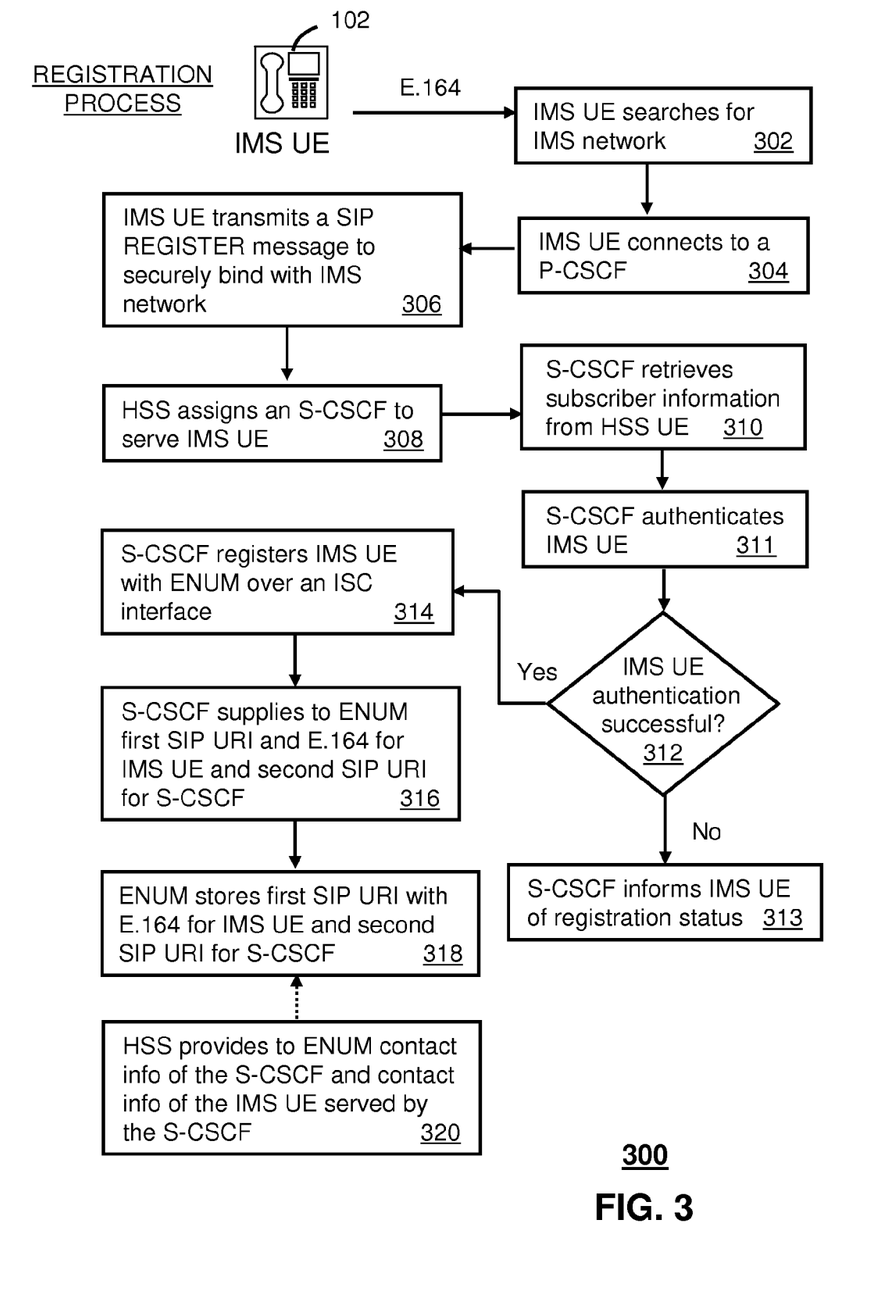
FIGS. 3-4 depict exemplary methods operating in portions of an IP Multimedia Subsystem (IMS) network.

FIG. 3 depicts an exemplary method 300 operating in portions of the IP Multimedia Subsystem (IMS) network 200. More specifically, the method 300 illustrates a means for registering IMS UE 102 with the ENUM system 230 in the IMS network 200. The method 300 can be practiced with more or less than the number of steps shown. Moreover, the method 300 is not limited to the order of steps shown. Reference will be made to FIG. 2 when describing the method 300, although it should be noted that the method 300 can be practiced in any other suitable system.

The method 300 can begin at step 302 in which an IMS UE 102 searches for the IMS network 200. The IMS UE 102 looks for a serving IMS network and attempts to connect to a P-CSCF as shown in step 304. The serving IMS network 200 can include at least one S-CSCF 216 and at least one P-CSCF 214 that provide connectivity services as shown in FIG. 2. The IMS UE 102 then transmits a SIP REGISTER message to build a secure binding with the serving IMS network 200 as shown in step 306. The SIP REGISTER message identifies an E.164 phone number associated with the IMS UE 100. During the registration, the HSS 240, at step 308, assigns S-CSCF 216 to the IMS UE 102. In step 310, the S-CSCF 216 retrieves subscriber information and credentials of the IMS UE 102 from the HSS 240. At step 311, the S-CSCF 216 authenticates IMS UE 102, and at step 312, checks whether the authentication process with the IMS UE 102 was successful. If the authentication fails, the S-CSCF 216 does not register the IMS UE 102 and informs the IMS UE 102 of the registration status at step 313.

If the authentication is successful, the S-CSCF 216 becomes a "serving" S-CSCF for the IMS UE 102. The binding of the IMS UE 102 and S-CSCF 216 is recorded by the HSS 240 and the P-CSCF 214. The S-CSCF 216 at step 314 proceeds to register the IMS UE 102 with the ENUM system 230. During registration, the S-CSCF 216 performs a "third-party registration" of the IMS UE 102 with the ENUM system 230 over the ISC interface 234. More specifically, at step 316, the S-CSCF 206 supplies to the ENUM system 230 a first SIP URI of the IMS UE 102 with its corresponding E.164 number, and a second SIP URI of the S-CSCF 216 over the ISC Interface 234. The ENUM system 230 associates the first SIP URI with the E.164 of the IMS UE 102 being registered, and associates the second SIP URI with the S-CSCF 216 assigned to the IMS UE 102. Alternatively, the S-CSCF 216 can supply the ENUM system 230 a fully qualified domain name, or IP address associated with itself and a corresponding fully qualified domain name or IP address associated with the IMS UE 102.

The ENUM system 230 stores the first SIP URI with the E.164 of the IMS UE 102, and stores the second SIP URI for the S-CSCF 216 assigned to the IMS UE, as shown in step 316. Thus, the ENUM system 230 contains a first contact information for the IMS UE 102, and a second contact information for the S-CSCF 216 serving the IMS UE 102. In an alternative embodiment, as shown in step 320, the HSS 240 can configure the ENUM system 230 instead of the S-CSCF 216 serving the UE 102 undergoing registration. In this instance, the HSS 240 supplies contact information associated with S-CSCF 216 and contact information associated with IMS UE 102 served by the S-CSCF 216. As before the contact information of the S-CSCF 216 can be a SIP URI, domain name, or IP address and the contact information the IMS UE 102 can be its E.164 number and corresponding SIP URI, domain name, or IP address. The HSS can configure the ENUM system 230 in response to a registration of the IMS UE 102 with the IMS network 200 from which the HSS 240 operates. The HSS 240 can send a notification to ENUM system 230 using an enhanced DIAMETER interface or a proprietary message interface containing the aforementioned contact information of the S-CSCF 216 and IMS UE 102.

Figure 4:
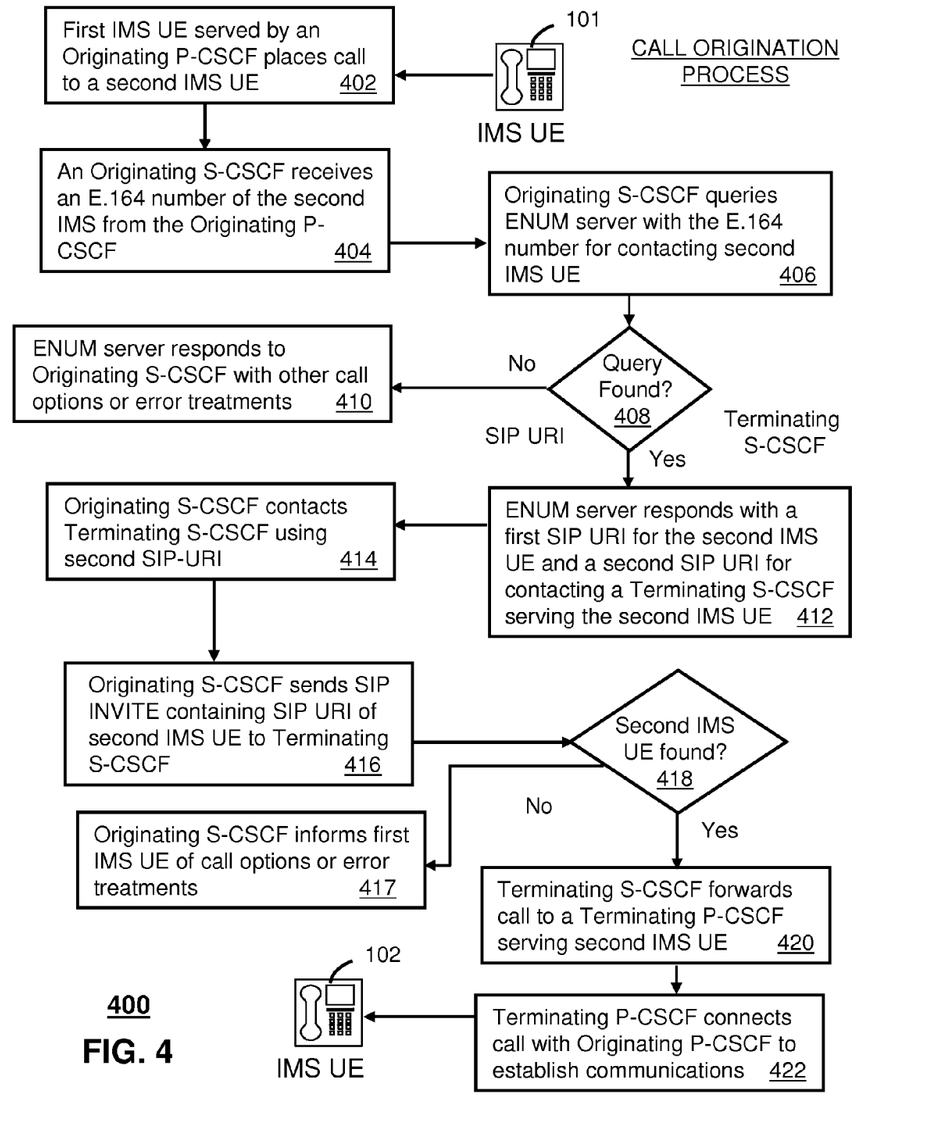

FIG. 4 depicts an exemplary method 400 operating in portions of the IP Multimedia Subsystem (IMS) network 200. More specifically, the method 400 illustrates a means for using the ENUM system 230 in a VoIP call based on intra-carrier IMS communications in the IMS network 200. The method 400 can be practiced with more or less than the number of steps shown. Moreover, the method 400 is not limited to the order of steps shown. Reference will be made to FIG. 2 when describing the method 400, although it should be noted that the method 400 can be practiced in any other suitable system.

The method 400 can begin at step 402 in which IMS UE 101 (e.g. of a calling party) served by an Originating P-CSCF 204 places a VoIP call to IMS UE 102 (e.g. of a called party). For example, the IMS UE 101 may be a VoIP phone placing a call to a second VoIP phone (e.g. IMS UE 102) within an intra-carrier system (e.g. AT&T to AT&T). The Originating P-CSCF 204 identifies an E.164 phone number of the IMS UE 102 being called, and forwards the E.164 number to an Originating S-CSCF 206. At step 404, the Originating S-CSCF 206 receives the E.164 number, and at step 406, queries the ENUM system 230 with the E.164 phone number.

At step 408, the ENUM system 230 can determine whether contact information for the IMS UE 102 is available in view of the E.164 number. Recall, the ENUM system 230 maps an E.164 phone number to first and second contact information of the IMS UE 102 during a registration. If the IMS UE 102 is registered with the ENUM system 230, the ENUM system 230 will have contact information available for IMS UE 102. If the contact information for IMS UE 102 is not available, or the IMS UE 102 is not registered, the ENUM system 230 can respond to the Originating S-CSCF 206 with other call options or error treatments as shown in step 410. For example, the second IMS UE 102 may be available on an inter-carrier system which does not perform a similar registration process as disclosed by method 300. In such a situation, the ENUM system 230 can respond with a query response similar to that of a prior art IMS network.

If the query at step 408 is successful, the ENUM system 230 responds, in step 412, with a first SIP URI for the second IMS UE 102 and a second SIP URI for contacting the Terminating S-CSCF 216 serving the IMS UE 102 (See FIG. 2). The Terminating S-CSCF 216 is associated with the second IMS UE 102 as a result of the aforementioned registration process (See method 300 FIG. 3). Broadly stated, the ENUM system 230 responds to a successful query with a first contact information for the IMS UE 102 and a second contact information for the S-CSCF serving the IMS UE 102.

Notably, the ENUM system 230 provides the Originating S-CSCF 206 contact information for the Terminating S-CSCF 216. As a result of the ENUM system 230 having the same contact information available in the HSS 240 for the Terminating S-CSCF 216 a query to the HSS is avoided during the call process. Removing the HSS query substantially reduces the workload of the HSS 240, reduces latency time for call setup, and reduces the number of HSS clusters in the IMS network 200, thereby also reducing cost and maintenance for HSS systems.

Upon the Originating S-CSCF 206 receiving contact information for the IMS UE 102 the SIP URI of the Terminating S-CSCF 216, Originating S-CSCF 206 contacts in step 414 the Terminating S-CSCF 216 by transmitting a SIP INVITE that contains the SIP URI of the IMS UE 102. The Terminating S-CSCF 216 can then proceed, at step 418, to search for the terminating P-CSCF 214 associated with the SIP URI of IMS UE 102. If IMS UE 102 is active and receiving calls, the Terminating S-CSCF 216 can, at step 420, forward the call to the Terminating P-CSCF 214 serving the IMS UE 102. At step 422, the Terminating P-CSCF 214 connects the call between IMS UE 102 and IMS UE 101. Returning back to step 418, the Terminating S-CSCF 216 can inform the Originating S-CSCF 206 and thus the first IMS UE 101 of call options and error treatments if the second IMS UE 102 is not available before the terminating S-CSCF 216 has time to update the ENUM system 230 at step 417.

Upon reviewing the embodiments disclosed, it would be evident to an artisan with ordinary skill in the art that said embodiments can be modified, reduced, or enhanced without departing from the scope and spirit of the claims described below. For example, the terms "Terminating" and "Originating" can be interchanged in FIG. 2 and methods 200-300 can be applied in a symmetric fashion to a call originating from IMS UE 102. Consequently, the ENUM system 230 is coupled to all S-CSCF's in FIG. 2 in the same manner without distinguishing which is an originating or terminating S-CSCF. Also, each S-CSCF of FIG. 2 performs the same registration process with the ENUM system 230 by way of the ISC interface 234 as previously described. Other suitable modifications can be applied to the present disclosure. Accordingly, the reader is directed to the claims for a fuller understanding of the breadth and scope of the present disclosure.

Figure 5:
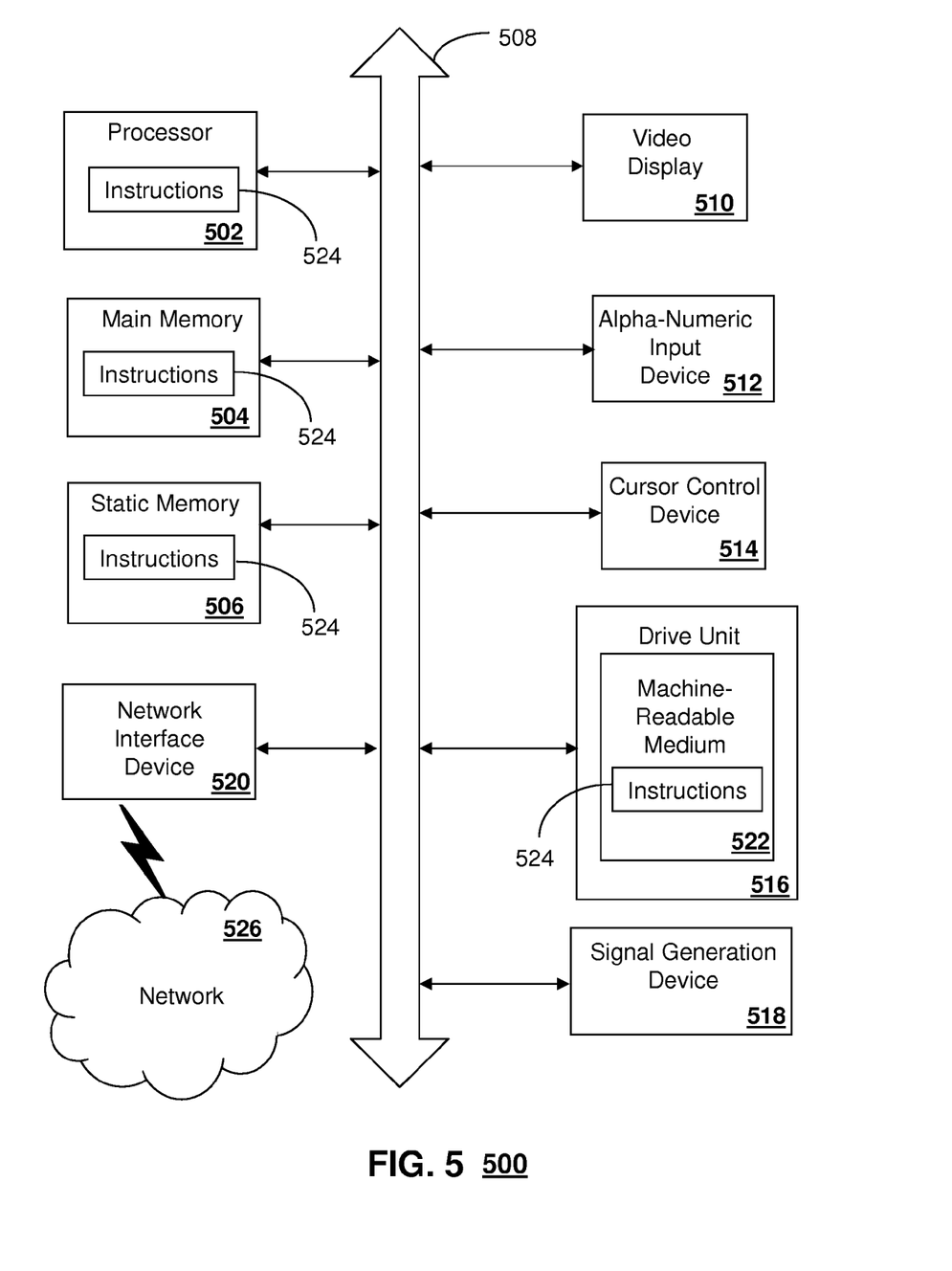
FIG. 5 depicts an exemplary diagrammatic representation of a machine in the form of a computer system within which a set of instructions, when executed, may cause the machine to perform any plurality of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium in an originating Serving Call Session Control Function comprising computer instructions for:
    querying a Telephone Number Mapping system to provide contact information associated with a communication device; and receiving from the Telephone Number Mapping system the contact information for the communication device and a contact information for a terminating Serving Call Session Control Function assigned to the communication device, wherein the contact information of the communication device comprises at least one of a domain name or an Internet Protocol address associated with the communication device, and wherein the contact information of the terminating Serving Call Session Control Function comprises at least one of a domain name or an IP address associated with the terminating Serving Call Session Control Function, wherein the originating Serving Call Session Control Function receives an assignment from a Home Subscriber Server, wherein the Telephone Number Mapping system provides the originating Serving Call Session Control Function the contact information for the terminating Serving Call Session Control Function, such that the Telephone Number Mapping system has the same contact information available in the Home Subscriber Server for the terminating Serving Call Session Control Function, and wherein when the contact information for the terminating Serving Call Session Control Function is provided by the Telephone Number Mapping system, the Telephone Number Mapping system avoids a query to the Home Subscriber Server during a call process to reduce the workload of the Home Subscriber Server, reduce latency time for call setup, and reduce the number of Home Subscriber Server clusters in an IP Multimedia Subsystem network.

2. The non-transitory storage medium of claim 1, comprising computer instructions for:

receiving from an originating Proxy Call Session Control Function an E.164 number associated with the communication device; and submitting to the Telephone Number Mapping system the E.164 number to retrieve the contact information for the communication device and the terminating Serving Call Session Control Function.

3. The non-transitory storage medium of claim 1, wherein the contact information of the communication device comprises a first Session Initiation Protocol Uniform Resource Identifier associated with the communication device, and wherein the contact information of the terminating Serving Call Session Control Function comprises a second Session Initiation Protocol Uniform Resource Identifier associated with the terminating Serving Call Session Control Function.

4. The non-transitory storage medium of claim 1, comprising computer instructions for submitting to the terminating Serving Call Session Control Function Session Initiation Protocol invite to establish communications with the communication device.

5. The non-transitory storage medium of claim 4, wherein the Session Initiation Protocol invite comprises a Session Initiation Protocol Uniform Resource Identifier associated with the communication device.

6. A Telephone Number Mapping system comprising:

a controller to receive from a terminating Serving Call Session Control Function first contact information for a communication device and second contact information for the terminating serving call Serving Call Session Control Function, wherein the controller:

receives from an originating Serving Call Session Control Function a query associated with an E.164 number of the communication device;

supplies to the originating Serving Call Session Control Function the first contact information for the communication device, and the second contact information for the terminating Serving Call Session Control Function, wherein the first contact information of the communication device comprises a first Session Initiation Protocol Uniform Resource Identifier, and wherein the second contact information of the terminating Serving Call Session Control Function comprises a second Session Initiation Protocol Uniform Resource Identifier, wherein the originating Serving Call Session Control Function receives an assignment from a Home Subscriber Server, and wherein the Telephone Number Mapping system provides the originating Serving Call Session Control Function contact information for the terminating Serving Call Session Control Function, such that the Telephone Number Mapping system has the same contact information available in the Home Subscriber Server for the terminating Serving Call Session Control Function; and avoids a query to the Home Subscriber Server during a call process to reduce the workload of the Home Subscriber Server, reduce latency time for call setup, and reduce the number of Home Subscriber Server clusters in an Internet Protocol Multimedia Subsystem network when the contact information for the terminating Serving Call Session Control Function is provided by the Telephone Number Mapping system.

7. The Telephone Number Mapping system of claim 6, comprising an Internet Protocol Multimedia Subsystem Service Control interface, wherein the controller receives by way of the Internet Protocol Multimedia Subsystem Service Control interface the first contact information for the communication device and the second contact information for the terminating Serving Call Session Control Function.

8. An originating communication device, comprising:

a controller to supply an Internet Protocol Multimedia Subsystem network an E.164 number for establishing communications between the originating communication device and a terminating communication device without assistance from an interrogating Interrogating Call Session Control Function, wherein an originating Serving Call Session Control Function associated with the originating communication device establishes communications with a terminating Serving Call Session Control Function associated with the terminating communication device to establish communications between the originating and terminating communication devices, and wherein the originating Serving Call Session Control Function submits the E.164 number to a Telephone Number Mapping system which supplies the originating Serving Call Session Control Function a first Session Initiation Protocol Uniform Resource Identifier associated with the terminating communication device and a second Session Initiation Protocol Uniform Resource Identifier associated with the terminating Serving Call Session Control Function, wherein the originating Serving Call Session Control Function receives an assignment from a Home Subscriber Server, and wherein the Telephone Number Mapping system provides the originating Serving Call Session Control Function contact information for the terminating Serving Call Session Control Function, such that the Telephone Number Mapping system has the same contact information available in the Home Subscriber Server for the terminating Serving Call Session Control Function, and wherein when the contact information for the terminating Serving Call Session Control Function is provided by the Telephone Number Mapping system, the Telephone Number Mapping system avoids a query to the Home Subscriber Server during a call process to reduce the workload of the Home Subscriber Server, reduce latency time for call setup, and reduce the number of Home Subscriber Server clusters in an Internet Protocol Multimedia Subsystem network.

* * * * *